United States Patent [19]

Lydford

[11] 4,169,055

[45] Sep. 25, 1979

[54] LIQUID STRAINING APPARATUS

[75] Inventor: Geoffrey Lydford, Orpington, England

[73] Assignee: Russell Finex Limited, London, England

[21] Appl. No.: 897,777

[22] Filed: Apr. 19, 1978

[30] Foreign Application Priority Data

May 6, 1977 [GB] United Kingdom ............... 19075/77

[51] Int. Cl.² ............................................. B01D 33/00
[52] U.S. Cl. ................................... 210/104; 210/110; 210/384
[58] Field of Search ............... 210/104, 125, 128, 384, 210/388, 110, 111; 209/269

[56] References Cited

U.S. PATENT DOCUMENTS

| 1,195,391 | 8/1916 | Newman | 210/110 |
| 3,263,817 | 8/1966 | Buckley | 210/388 |
| 3,823,823 | 7/1974 | Dokter et al. | 210/125 X |
| 3,833,123 | 9/1974 | Walker | 210/388 X |

FOREIGN PATENT DOCUMENTS 13863  6/1897  United Kingdom ..................... 209/269

*Primary Examiner*—John Adee
*Attorney, Agent, or Firm*—Wenderoth, Lind & Ponack

[57] ABSTRACT

A liquid strainer has a screen arranged to be vibrated by out-of-balance weights. A removable container holds a body of liquid to be strained above the screen and liquid is supplied to the container via a valve and a flexible connection. Liquid passing through the screen is collected in a tank beneath the strainer. Level detectors in both the removable container and the collecting tank control the valve to turn off liquid supply when either level exceeds a predetermined height. The entire apparatus is completely enclosed.

8 Claims, 1 Drawing Figure

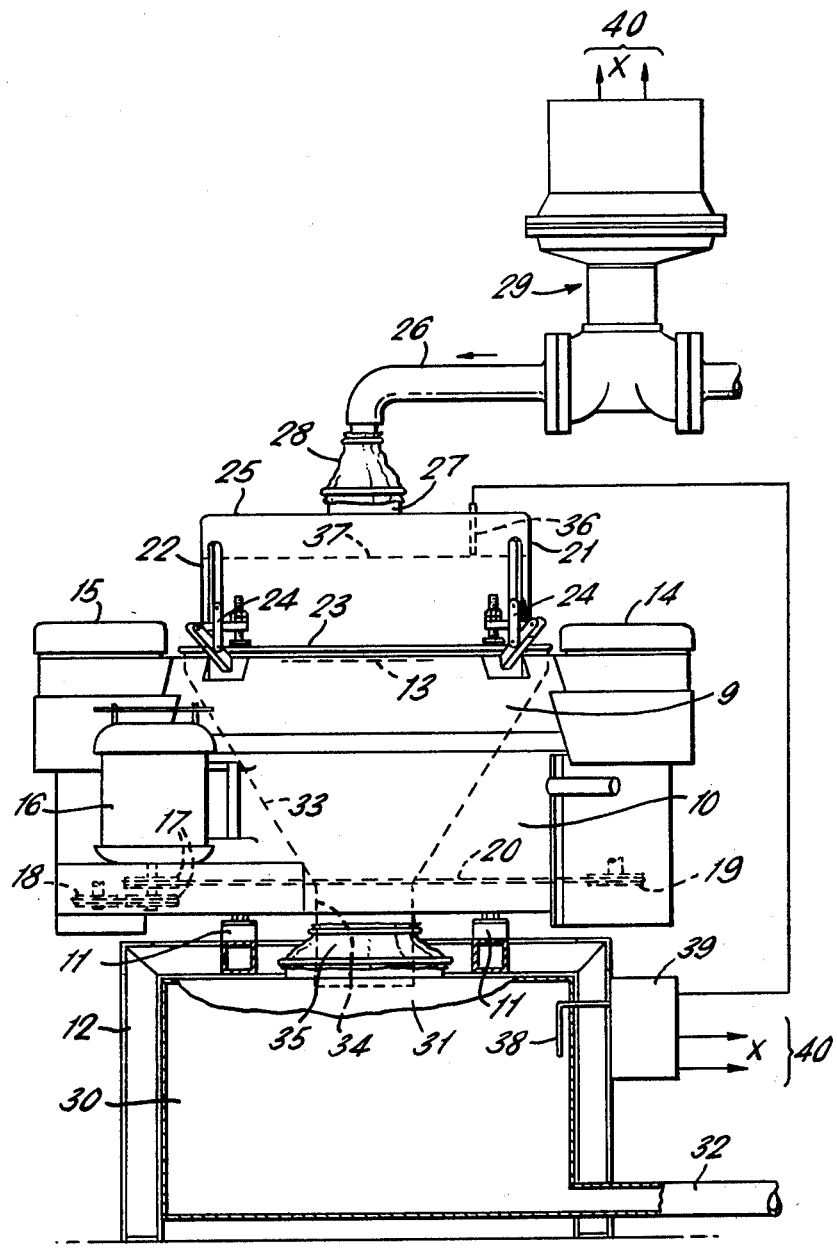

LIQUID STRAINING APPARATUS

BACKGROUND AND SUMMARY OF THE INVENTION

The present invention relates to apparatus for straining liquids.

According to the present invention an apparatus for straining liquids comprises a straining screen, means mounting the screen for vibration, means operable to vibrate the screen, means for containing a body of liquid to be strained on top of and in contact with the screen, means for supplying liquid to be strained to the containing means and having a valve operable to halt the supply, a level detector in the containing means and control means automatically responsive to detection by the level detector of a liquid level in the containing means above a predetermined maximum level to operate the valve to halt the liquid supply to the containing means. In operation the vibration of the screen of the above straining apparatus considerably increases the time during which liquid can be strained before the screen becomes blocked or blinded by accumulated solids strained out of the liquid. Thus, the "down time" of the apparatus can be reduced. Furthermore, the automatic control means ensures that the supply of liquid to be strained is halted to prevent overflow of the containing means. In this way the apparatus can be left to operate without the need for an operator continuously monitoring the liquid level above the straining screen to guard against spillage.

Very conveniently, the container means is arranged to enclose substantially completely the body of liquid to be strained. Such an arrangement is rendered practicable by the provision of the automatic control means, since otherwise the container means must be open so that an operator can view the liquid level. By making the container means substantially completely enclosed any noxious gases or solvents given off by the liquid to be strained are prevented from reaching the atmosphere. This has special advantages when the apparatus is used for straining paints, since, not only is the contamination of the atmosphere by solvent vapours from the paint reduced, but the evaporation of the solvents from the paint is itself reduced, thus reducing the tendency of the paint to set or skin during straining.

In one embodiment, the containing means comprises an upwardly extending skirt sealed around the periphery of the screen and a cover extending inwardly from the top of the skirt over the screen, a flexible connection being provided between the container means and the liquid supply means.

Preferably the straining apparatus includes a buffer tank disposed below the screen and arranged to receive the liquid passing through the screen. The buffer tank enables strained liquid to be stored for delivery for further processing as required. Very conveniently, the buffer tank is disposed immediately beneath the screen, so that the liquid passing through the screen can fall directly into the tank. Then means may be provided for directing liquid passing through the screen into the buffer tank, and a flexible coupling may be provided between the tank and such directing means, so that liquid in the buffer tank is substantially completely enclosed.

It will be appreciated that the flexible coupling between the buffer tank and the directing means and the flexible connection between the containing means and the liquid supply means allow for the vibration of the straining screen during operation of the apparatus.

Preferably a second level detector is provided in the buffer tank for detecting a maximum level in the tank, and the control means is automatically responsive also to the detection by the second detector of the maximum level to operate the valve to halt liquid supply to the container means. In this way the supply of liquid to be strained is cut off when the buffer tank becomes nearly full. It will be appreciated that the maximum level in the buffer tank detected by the level detector is selected to enable any remaining body of unstrained liquid above the strainer in the containing means to pass through the strainer without causing the buffer tank to overflow.

In one embodiment, the means operable to vibrate the screen includes two out of balance weight assemblies on opposite sides of the screen and rotatable substantially in the same plane as the screen, and a motor connected to rotate the assemblies so that the screen vibrates substantially in its own plane.

BRIEF DESCRIPTION OF THE DRAWING

An example of the present invention will now be described with reference to the accompanying drawing which is an elevational view, partly in cross-section, of liquid straining apparatus embodying the present invention.

DETAILED DESCRIPTION OF THE INVENTION

In the straining apparatus a frame 9 is mounted for vibratory movement with respect to a base 10. Any suitable arrangement for mounting the frame 9 on the base 10 may be employed which provides the desired degree of freedom of movement between the frame and the base. Usually, the mounting arrangement will permit only a primarily horizontal relative movement between the frame 9 and the base 10. The base 10 is itself mounted by means of isolating feet 11 on a structural frame 12 standing on the ground. The isolating feet 11 are typically rubber blocks which can absorb any residual vibration in the base 10 during vibratory movement of the frame 9.

Mounted in the frame 9 there is a screen 13, substantially in a horizontal plane. The frame 9 and the screen 13 typically have circular symmetry, when viewed from above in the drawing, and a pair of out of balance weight assemblies 14 and 15 are mounted for rotation about axes which are fixed at diametrically opposed locations relative to the frame 9. The out of balance weight assemblies 14 and 15 are arranged so that the axes of rotation of the out of balance weights are substantially vertical. A motor 16, typically an electric motor, is mounted on the base 10 of the machine and is arranged for driving the out of balance weight assemblies 14 and 15 via an arrangement of pulleys and belts 17 to 20.

A lid 21 is mounted over the screen 13. The lid comprises a skirt 22 having its bottom edge sealed around the periphery of the screen 13 so that a body of liquid to be strained through the screen can be contained on top of and in contact with the screen.

Conveniently, both the lid 21 and the screen 13 can be removed from the frame 9, so that the screen 13 can be cleaned. During operation, the screen 13 and the lid 21 are firmly clamped to the frame 9 by means of toggle clamps 24 mounted at spaced intervals about the periphery of the screen. The clamps are effective to apply a downward pressure on a flange 23 at the bottom of the skirt 22 of the lid 21 pressing the lid on to the periphery of the screen 13 to provide a seal therewith. Normally a rubber sealing ring is provided to ensure that the seal between the skirt 22 and the screen 13 is liquid tight.

The lid 21 includes a cover portion 25 extending inwardly from the top of the skirt 22. A supply conduit 26 for fluid to be strained is connected with a flanged aperture 27 provided substantially in the middle of the cover 25 by a flexible connection 28. The flexible connection 28 may comprise a length of flexible pipe or, as in the illustrated embodiment, a tube of impervious flexible material clamped sealingly about the end of the conduit 26 and the flange of the aperture 27. Thus, the lid 21 provides a completely enclosed container over the screen 13 substantially isolating liquid to be strained from the atmosphere. In the straining of paint, this has particular advantages in preventing the escape of solvent vapours. A valve 29 is provided in the supply conduit 26 for shutting off the supply of liquid to be strained.

A buffer tank 30 is located under the straining machine for the collection of strained liquid passing through the screen 13. As shown in the drawing, the buffer tank 30 is positioned immediately below the screen 13 so that strained liquid can flow directly into it. The tank 30 is straddled by the supporting structural frame 12 on which the straining machine stands. The tank 30 has an aperture 31 in its top wall for the entry of strained liquid and an outlet pipe 32 towards the bottom of a side wall. Strained liquid is directed into the aperture 31 from the screen 13 by means of a conical funnel 33 connected at its upper end about the periphery of the screen 13 and having a neck portion 34 extending downwardly from the straining machine through the aperture 31 into the tank 30. The aperture 31 is flanged and a tube 35 of flexible material is provided clamped to the flange of the aperture 31 and to the neck portion 34 substantially to isolate the strained liquid flowing down through the funnel 33 and in the buffer tank 30 from the atmosphere.

With the above described arrangement it can be seen that the complete straining process is substantially wholly enclosed and isolated from the atmosphere from the supply of liquid to the top of the screen 13 and the delivery of the strained liquid to the buffer tank 30. Especially with the straining of paint, such an arrangement has clear advantages both in the reduction of escape of any noxious vapours and in the reduction of setting and skinning in the paint as it is strained.

The straining apparatus includes a probe 36 for detecting when the level of unstrained liquid contained above the screen 13 rises above a predetermined level, e.g. the level 37 shown in the drawing. A further probe 38 mounted in the buffer tank 30 also detects when the level of strained liquid in the buffer tank rises above a predetermined level. The two probes 36 and 38 are connected to a control box 39. The control box 39 is arranged to be responsive to the detection by either one of the probes 36 and 38 to a liquid level in excess of the respective predetermined level to connect a supply of compressed air across air leads 40 which are connected to the valve 29. The valve 29 is an air operated double-acting ball plug valve and the connection of the supply of compressed air to the leads 40 causes the valve to close and halt the supply of liquid along the conduit 26. Thus the apparatus is arranged automatically to stop the supply of liquid to be strained either when the level above the screen 13 exceeds a predetermined maximum or the level in the buffer tank 30 exceeds the predetermined level. It will be appreciated that the predetermined level in the buffer tank 30 should be below the level at which the tank becomes full so that any liquid to be strained still contained above the screen 13 when the supply is halted can be accommodated in the tank. The control box 39 is further arranged to operate the valve 29 to restart the flow of liquid for straining when both the probes 36 and 38 indicate that the levels in the cover 21 and the tank 30 respectively are again below the predetermined maximum levels.

The ball plug valve employed for the valve 29 is especially useful when the liquid being strained is paint because the shearing action of the ball plug valve can cut through any skins or solid matter which might otherwise jam the valve.

We claim:

1. An apparatus for straining liquids, said apparatus comprising:
   a straining screen;
   means mounting said screen for vibration;
   means operable to vibrate said screen;
   container means for containing a body of liquid to be strained on top of and in contact with said screen;
   means for supplying liquid to be strained to said container means and having a valve operable to halt said supply;
   a level detector in said container means; and
   control means automatically responsive to detection by said level detector of a liquid level in said container means above a predetermined maximum level to operate said valve to halt the liquid supply to said container means.

2. An apparatus as claimed in claim 1, wherein said container means is arranged to enclose substantially completely the body of liquid to be strained.

3. An apparatus as claimed in claim 2, wherein said container means comprises an upwardly extending skirt sealed around the periphery of said screen, and a cover extending inwardly from the top of said skirt over said screen, a flexible connection being provided between said container means and said liquid supply means.

4. An apparatus as claimed in claim 1, further comprising a buffer tank disposed below said screen and arranged to receive the liquid passing through said screen.

5. An apparatus as claimed in claim 4, wherein said buffer tank is disposed immediately beneath said screen, so that the liquid passing through said screen can fall directly into said tank.

6. An apparatus as claimed in claim 5, further comprising means for directing liquid passing through said screen into said buffer tank, and a flexible coupling between said tank and said directing means, so that liquid in said buffer tank is substantially completely enclosed.

7. An apparatus as claimed in claim 4, further comprising a second level detector provided in said buffer tank for detecting a maximum level in said tank, and wherein said control means is automatically responsive also to the detection by said second detector of said maximum level in said tank to operate said valve to halt liquid supply to said container means.

8. An apparatus as claimed in claim 1, wherein said means operable to vibrate said screen includes two out of balance weight assemblies on opposite sides of said screen and rotatable substantially in the same plane as said screen, and a motor connected to rotate said assemblies so that said screen vibrates substantially in its own plane.

* * * * *